United States Patent [19]

Smetana

[11] Patent Number: 4,471,248
[45] Date of Patent: Sep. 11, 1984

[54] ELECTRIC MOTOR WITH ELASTIC VIBRATION DAMPING ROTOR TO SHAFT COUPLING

[75] Inventor: Roland Smetana, Vienna, Austria

[73] Assignee: U.S. Philips Corporation, New York, N.Y.

[21] Appl. No.: 528,376

[22] Filed: Sep. 1, 1983

[30] Foreign Application Priority Data

Sep. 15, 1982 [AT] Austria ................................. 346082

[51] Int. Cl.³ .............................................. H02K 5/24
[52] U.S. Cl. ..................................... 310/51; 310/261; 310/265
[58] Field of Search ..................... 310/51, 91, 261–267

[56] References Cited

U.S. PATENT DOCUMENTS

| 2,929,944 | 3/1960 | Shewmon | 310/51 UX |
| 3,226,579 | 12/1965 | Bygdnes | 310/51 |
| 3,317,166 | 5/1967 | Janssen | 310/51 UX |
| 3,361,914 | 1/1968 | Janssen | 310/51 |
| 3,459,978 | 8/1969 | Trucks et al. | 310/51 |
| 3,483,407 | 12/1969 | Frohmuller et al. | 310/51 |
| 3,512,022 | 5/1970 | Gilbert | 310/51 X |

Primary Examiner—Mark O. Budd
Attorney, Agent, or Firm—R. S. Smith

[57] ABSTRACT

In an electric motor comprising a rotor which is connected to at least one hub on the motor shaft by means of elastic connecting elements, at least two elastic connecting elements are constructed as ribs which have a resilient action, which extends substantially radially and axially, and which connect the rotor, which in itself is clear of the motor shaft, to the hub.

18 Claims, 10 Drawing Figures

ELECTRIC MOTOR WITH ELASTIC VIBRATION DAMPING ROTOR TO SHAFT COUPLING

The invention relates to an electric motor comprising a rotor which is connected to at least one hub on the motor shaft by means of elastic connecting elements. Such a motor is described in, for example, U.S. Pat. No. 3,226,579. In this known motor the elastic connecting elements are constructed as rubber pads which serve to ensure that fluctuations in the circumferential velocity of the rotor are not transmitted to the shaft. Such rubber pads act as vibration absorbers with a damping effect. Since rubber pads allow a transverse movement, the rotor of this known motor must be supported rotatively on the motor shaft by means of a sleeve bearing to inhibit transverse vibrations of the rotor relative to the motor shaft. However, via the sleeve bearing a some degree of coupling is established between the actual rotor and the motor shaft, which may have an adverse effect in particular in the case of small vibration amplitudes because in such cases the sleeve bearing will loose its sliding properties and will gradually act as a more or less rigid connection.

It is the object of the invention to further simplify the construction of a motor of the type defined in the opening sentence and to provide an optimum isolation of vibrations between the rotor and the motor shaft, in such a way that the influence of the load which is connected to the motor shaft is also allowed for. According to the invention at least two elastic connecting elements are constructed as ribs which extend substantially radially and axially, which have a resilient action, and which connect the rotor, which in itself is clear of the motor shaft, to the hub. This provides an optimum isolation of the rotor from the remainder of the mechanical vibration system comprising the rotor and the motor shaft carrying the parts to be driven, namely the load and a rotor of an optional tachogenerator which forms part of a motor-control servo system. By a suitable vibration-engineering design of the ribs the frequency response of the entire vibration system can be influenced so as to preclude disturbances or instabilities in the system and so as to substantially eliminate fluctuations in the motor-shaft rotation. By the use of ribs which connect the rotor to the hub separate bearing means for the rotor may be dispensed with, because the ribs are stiff in the radiation direction and thereby inhibit transverse vibrations, which results in a particularly simple construction and which provides the desired isolation of the motor shaft from vibrations because the rotor is entirely clear of the motor shaft.

The ribs may be arranged for example in such a way that they connect the rotor to the hub in the radial direction. However, it is found to be particularly advantagous if the hub is arranged adjacent and axially spaced from the rotor and the ribs connect the rotor to the hub in the axial direction. Ribs arranged in this way can be dimensioned in a particularly favourable manner with respect to their vibration properties.

Furthermore, in an electric motor in which at least one elastic connecting element is constructed as a vibration absorber with a damping action, it is found to be particularly advantageous if, in addition to the ribs which have a resilient action, there is provided at least one vibration absorber with a damping action. Such a vibration absorber, which may for example be constructed as a rubber pad as described in the afore-mentioned U.S. Pat. No. 3,226,579, in known manner, introduces a damping in the vibration system which leads to a further stabilisation of the system.

It is found that a construction which is advantageous in this respect is obtained if viewed in the circumferential direction of the hub at least one vibration-absorber is arranged between at least two adjacent ribs. This leads to a very compact construction.

In a motor in which the rotor is mounted on a support an advantageous construction is also obtained if the ribs connect the support to the hub, and the support, the ribs and the hub are integrally formed, suitably from a plastics. Such a construction is particularly simple to manufacture and is therefore very suitable for series production.

Embodiments of the invention will now be described in more detail, by way of example, with reference to the drawings.

Figure 5:
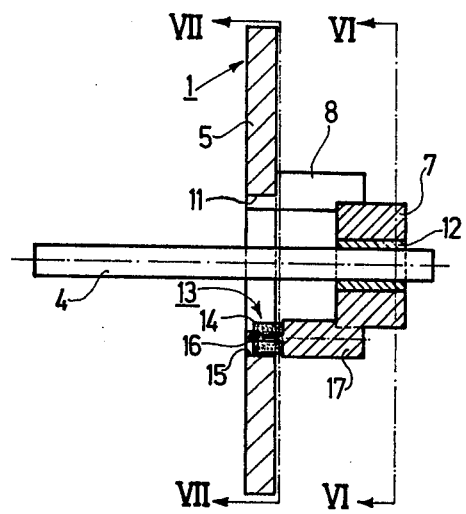

FIG. 5 also shows a disc rotor which is mounted on the motor shaft by means of a hub, the rotor and the hub being connected to each other via six ribs, three vibration absorbers being arranged between the rotor and the hub.

Figure 6:
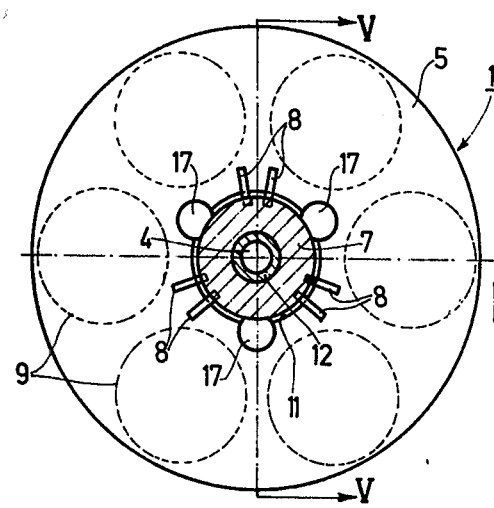

FIG. 6 is a sectional view of the rotor taken on the line VI—VI in FIG. 5.

Figure 7:
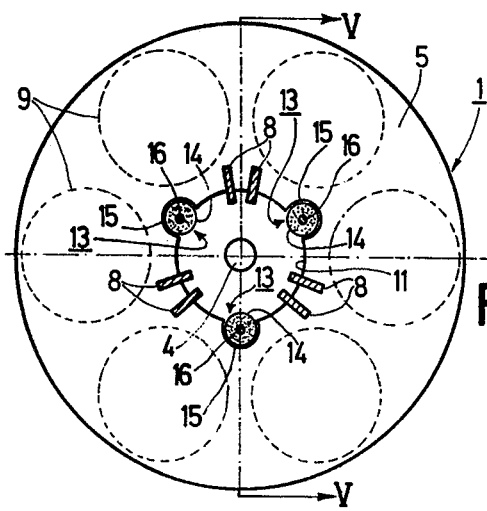

FIG. 7 is a sectional view of said rotor taken on the line VII—VII in FIG. 5.

Figure 8:
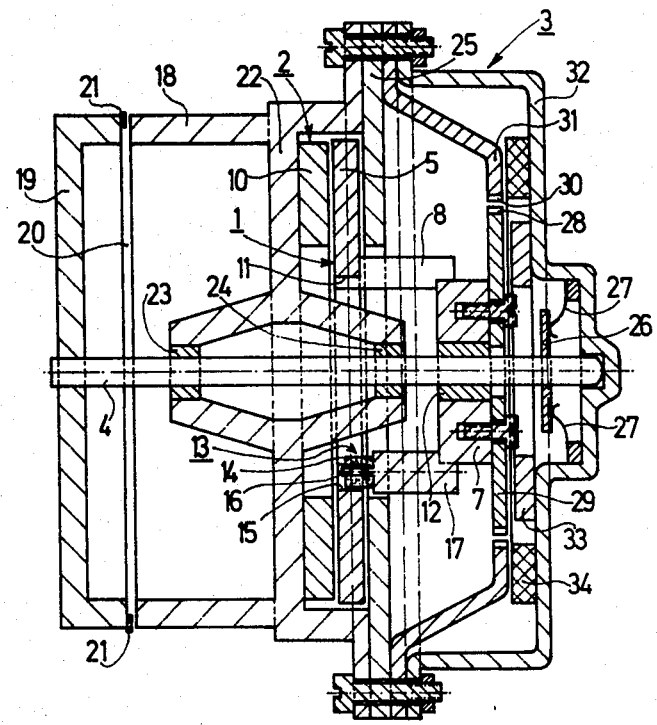

FIG. 8 shows a scanning unit for a recording and/or reproducing apparatus, in which a rotatable magnetic-head system forms a unit with a disc-rotor motor and a tacho-generator.

Figure 9:
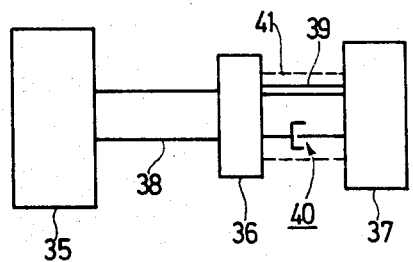

FIG. 9 shows the mechanical vibration model for the scanning unit shown in FIG. 8.

Figure 10:
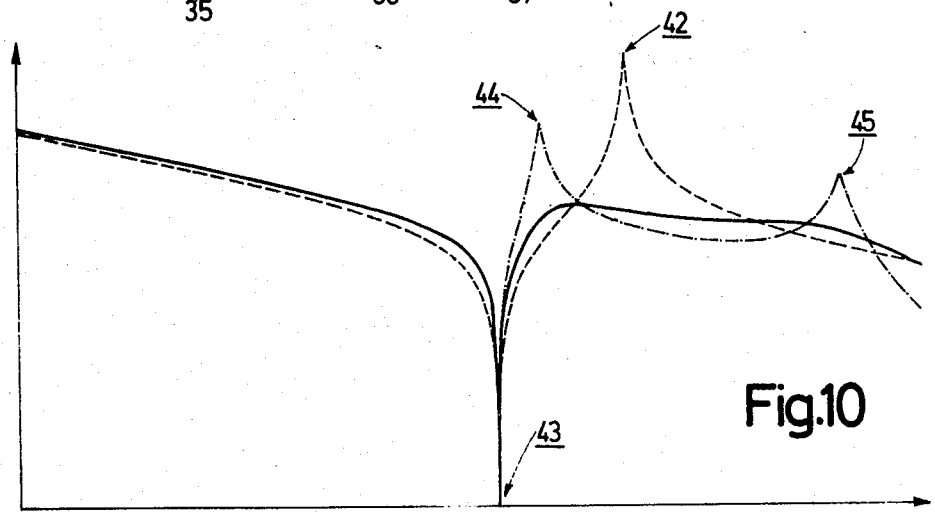

FIG. 10 shows frequency characteristics for the mechanical vibration model shown in FIG. 9.

Figure 1:
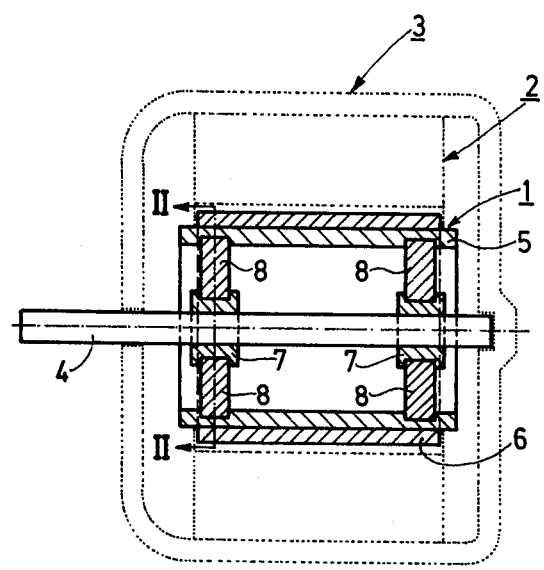
FIG. 1 is an axial sectional view of an electric motor whose rotor is mounted on the motor shaft by means of two hubs, the rotor being connected to each of the hubs by two ribs which provide a connection in the radial direction.
Figure 2:
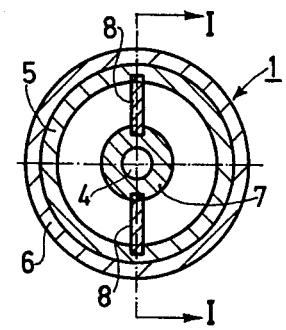
FIG. 2 is a sectional view of the motor taken on the line II—II in FIG. 1.

The electric motor in FIG. 1 comprises a rotor 1, which is also shown in FIG. 2, a stator 2, which is provided with exciter windings, not shown, and a housing 3. The rotor 1 is mounted on a motor shaft 4 which is rotatably journalled in the housing 3. In the present embodiment the motor is a hysteresis motor with a rotor 1, comprising a ring 6 which is arranged opposite the stator 2 on a hollow cylindrical support 5 of a non-magnetic material, and which is made of a magnetic material with hysteresis properties.

Such electric motors, as well as electric motors using different operating principles, have the problem that via their excitation which provides the drive undesired vibrations may be superimposed on the circumferential rotor speed which are transmitted to the rotating motor shaft via the rotor. For many uses of electric motors such fluctuations in the rotation of the motor shaft are not desirable or impermissible. This is also the case when such a motor is arranged in a control circuit, because said fluctuations can be eliminated only to a certain extent by the control circuit. In order to solve this problem it has been proposed to arrange a vibration absorber, which provides a damping action, between the rotor itself and its drive connection to the motor shaft. However, such a step does not provide an entirely satisfactory result. It has been found that satisfactory results can be obtained if the coupling of the rotor to the motor shaft is resilient so as to obtain an isolation within the vibration system comprising the rotor and the motor shaft plus the load driven by the shaft. This is achieved in that the rotor itself is entirely clear of the motor shaft and is connected to at least one hub on the motor shaft by means of elastic connecting elements only. The elastic connecting elements are constructed as substantially radial and axial ribs having a resilient action. In this way fluctuations in the rotation of the motor shaft are largely precluded and a stable overall system is obtained.

In the embodiment shown in FIGS. 1 and 2 the support 5 of the rotor 1 is a hollow cylinder and the rotor is mounted on the motor shaft 4 by means of the spaced hubs 7, which are arranged on the motor shaft 4 inside the hollow cylindrical support 5. The connection between the support 5 and the two hubs 7 in the radial direction is established via radial and axial ribs 8, which engage corresponding recesses in the hubs 7 and in the support 5. In the present embodiment two diametrically opposite ribs 8 provide the connection between a hub 7 and the support 5. In this way the rotor 1, which comprises the support 5 and the ring 6, is clear of the motor shaft 4 and is connected to the hub 7 on the motor shaft 4 via the ribs 8 only. Since the ribs 8 are stiff in the radial direction, no further bearing means for the rotor 1 are required. As regards the choice of the material and the dimensions, in particular the cross-sectional dimensions in the plane in which the forces occurring in the case of a resilient deflection are active, said ribs 8 are constructed using customary vibration-engineering techniques, in such a way that they yield elastically to the rotary driving movement and thus provide a resilient action. The ribs 8 may be for example plastics parts or they may comprise plate springs. In this way the resilient action of the ribs 8 ensures that vibrations transmitted to the rotor 1 itself are not transmitted, or only to a reduced extent, to the hubs 7 and hence to the motor shaft 4.

Figure 3:
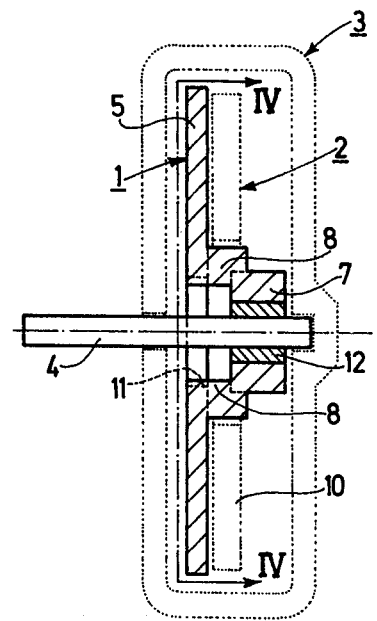
FIG. 3 shows an electric motor whose rotor, which is constructed as a disc rotor, is mounted on the motor shaft by means of a hub, the connection between the rotor and the hub being obtained by means of two ribs which provide a connection in the axial direction.
Figure 4:
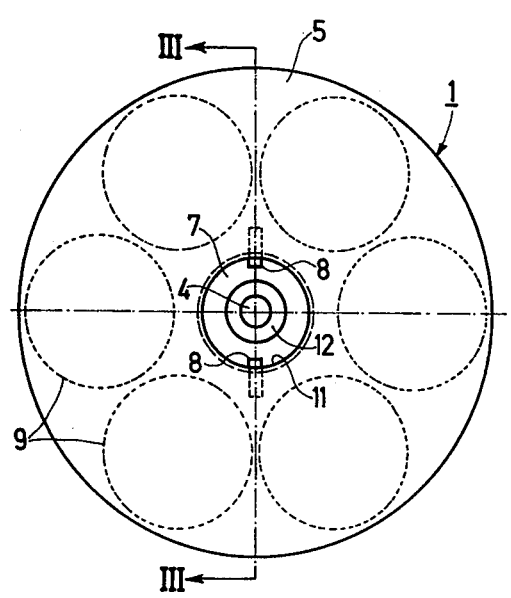
FIG. 4 is a sectional view of the rotor of the motor shown in FIG. 3, taken on the line IV-IV in FIG. 3.

The embodiment shown in FIGS. 3 and 4 is a disc-rotor motor, whose rotor 1 comprises a disc-shaped support 5 of a non-magnetic material in which a plurality of coils are arranged, as is indicated by the dashed circle in FIG. 4. These coils, which are alternatively energized by a collector or a drive circuit, are disposed opposite a stator 10 in the form of a magnetic ring 10, which is axially magnetized and which alternately exhibits north poles and south poles in the circumferential direction, the housing 1 being used as the magnetic return path, so that the magnetic stator fields extend through the coils 9 in the axial direction.

Again the rotor 1 is entirely clear of the motor shaft 4, the motor shaft extending through a central bore 11 in the support 5. In the present case the rotor 1 is mounted on the motor shaft 4 by means of only one hub 7, which is axially spaced from and arranged adjacent the disc-shaped support 5 of the rotor 1. The connection between the support 5 and the hub 7 is again established by two diametrically opposite ribs 8, the ribs 8 now connecting the rotor 1 to the hub 7 in the axial direction, as can be seen in FIG. 3. The vibration properties of ribs arranged in this way can favorably be dimensioned so as to obtain a high degree of resilience. In the present embodiment the support 5, the ribs 8 and the hub 7 are manufactured integrally from a plastics, which is particularly favourable for the series production of such a rotor. In the hub 7 a metal sleeve 12 is inserted for the correct mounting of the hub 7 on the motor shaft 4. As can be seen, the rotor 1, which is clear of the motor shaft 4, is coupled to the hub 7 and thus to the motor shaft 4 so that it is elastically yielding to the rotary driving movement, so that again undesired vibrations cannot be transmitted from the rotor 1 to the motor shaft 4, thereby guaranteeing a stable, uniform and smooth rotation of this shaft.

FIGS. 5, 6 and 7 show a modification to the disc-rotor 1 in the embodiment shown in FIGS. 3 and 4. As can be seen in FIGS. 6 and 7, six ribs 8 are provided for the connection of the disc-shaped support 5 of the rotor 1 to the hub 7, which ribs again extend in a substantially radial axial direction and connect the rotor 1 to the hub 7, which is axially spaced from and disposed adjacent this rotor. The ribs 8 are arranged centrally symmetrically, every two adjacent ribs being arranged at a smaller distance from each other than the other adjacent ribs in the circumferential direction of the hub 7, in order to enable one of three vibration absorbers 13 to be arranged in each of the larger intermediate gaps thus formed. Each of these vibration absorbers, which provide a damping in known manner, comprises a hollow cylindrical rubber buffer 14, which is fitted in a cylindrical recess 15 in the support 5 and whose other end engages with a pin 16 protruding from a projecting portion 17 on the hub 7. Thus, in addition to the ribs 8 which constitute elastic connecting elements, the rubber buffers 14 also form elastic connecting elements, which act between the support 5 of the rotor 1 and the hub 7. However, the operating principles of these two types of elastic connecting elements differ in that the ribs 8 present a resilient action to the rotary driving movement and the vibration absorbers provide a damping action. It is to be noted that for the sake of clarity FIG. 7 only shows those elastic elements, i.e. a rib 8 and a vibration absorber 13, which are situated directly in the plane of cross-section, and does not show the other elastic connecting elements which are disposed further behind the plane of cross-section, the positions of the latter elements being apparent from FIGS. 6 and 7. It is obvious that the arrangement of the ribs and the vibration absorbers may be different and that a different number of elements may be chosen, depending on constructional and vibration-engineering requirements.

The combined use of ribs 8 which provide a resilient action and vibration absorbers 13 having a damping action as described in the foregoing, for coupling the rotor 1 to the hub 7 and thus to the motor shaft 4, eliminates the transmission of vibrations from the rotor to the motor shaft to a very high extent.

The relevant steps may be used advantageously in order to reduce undesired effects introduced into the system by the load which is driven by the motor shaft and by a motor control device, so that all in all a very stable system is obtained, as will be described hereinafter.

FIG. 8 shows an example using a motor having a disc rotor as shown in FIGS. 5 to 7. This concerns a scanning device of a recording and/or reproducing apparatus for a record carrier in the form of a tape on which oblique tracks are scanned by rotary magnetic heads.

Such a scanning use, in known manner, comprises a stationary drum section 18 and a rotatable drum section 19 which is coaxial with the last-mentioned drum section. Between these two drum sections 18 and 19 a gap 20 is formed in which magnetic heads 21 arranged on the drum section 19 are situated, said heads projecting slightly from the circumferential surfaces of the two drum sections 18 and 19, so that they can cooperate with the record carrier which is wrapped around the circumferential surfaces of the two drum sections 18 and 19 along a helical path. Since the coaxial position of the two drum sections 18 and 19 and the uniformity of the speed of rotation of the driven drum section 19 must comply with very stringent requirements, the two drum sections are suitably combined to form a unit with the drive motor. Therefore, the stationary drum section 19 is formed on a housing section 22 of the disc-rotor motor, said housing section 22 also carrying two bearings 23 and 24 for the motor shaft 4, on whose free end the rotatable drum section 19 is mounted. The housing section 22 further carries the magnetic ring 10 which forms the stator 2 and which is arranged opposite the support 5 of the disc rotor 1, which rotor is coupled to the hub 7 on the motor shaft 4 via ribs 8 and vibration absorbers 13 as described with reference to FIGS. 5 to 7. An annular plate 25 again forms a magnetic return path for the magnetic field produced by the magnetic ring 10. Via leads, not shown, the coils in the support 5 are energized from a collector 25, which is also mounted on the motor shaft 4 and to which the necessary signals for energizing the coils of the rotor 1 are applied via wiper contacts 27. In order to ensure the required high uniformity of the circumferential speed of the rotary drum section 19 there is provided a control circuit, not shown, for deriving the electric signals to be applied to the rotor coils, which control circuit is formed by a servosystem and receives the output signal of a tacho-generator which is driven by the motor shaft 4, so that its output signal is a measure of the instantaneous circumferential speed of the motor shaft 4. Since such servo systems are generally known, they are not described in more detail. The tacho-generator comprises a disc 28 with circumferential teeth, which is mounted on the hub 7, to act as a rotor for the tacho-generator. The teeth 28 of said disc 29 face teeth 30 of a ring 31 arranged on the housing, which together with a further housing section 32 provides a magnetic return path for the axial magnetic field produced by a magnetic ring 33, which magnetic field extends through an annular coil 34 arranged between the ring 31 and the housing 32, said coil supplying the output signal of the tacho-generator.

In such a drive system the parts which rotate with the motor shaft 4 comprise the disc rotor 1, the hub 7, the disc 29 forming the rotor of the tacho-generator, the drum section 19, which forms the actual load, and the collector 26, whose influence may be ignored. Each of these parts constitutes a specific flywheel mass, the flywheel masses of the hub 7 and the disc 29 being regarded as one flywheel mass because the disc 29 is directly secured to the hub 7. This common flywheel mass is connected to the flywheel mass of the drum section 19 via the motor shaft 4 and to the flywheel mass of the disc rotor 1 via the elastic connecting elements 8 and 13, so that a vibration system with specific properties is obtained. For such a vibration system a mechanical vibration model may be defined, as shown in FIG. 9. In this Figure the rectangle 35 designates the flywheel mass of the drum section 19, the rectangle 36 the common flywheel mass of the hub 7 and the disc 29 connected to it, and the rectangle 37 the flywheel mass of the disc rotor 1. The rectangle 38 symbolically represents the coupling of the hub 7 and the disc 29 to the drum section 19 via the motor shaft 4, the rectangle 39 the resilient coupling of the disc rotor 1 via the ribs 8, and the symbol 40 the damping coupling of the disc rotor 1 to the hub 7 and the disc 29 via the vibration absorbers 13. The widths of the rectangles 38 and 39 indicate the different degrees of resilient coupling, in such a way that the motor shaft 4 constitutes a comparatively rigid coupling, while the ribs 8 provide a resilient coupling. The behaviour of such a vibration system may be described in known manner by means of frequency characteristics. FIG. 10 shows these frequency characteristics, the frequency being plotted on the horizontal axis in accordance with a logarithmic scale and the quotient of the angular frequency of the flywheel mass 34, i.e. of the drum section 19, and the torque of the flywheel mass 37, i.e. of the disc rotor 1, is plotted on the vertical axis, also in accordance with a logarithmic scale. Such a frequency characteristic, as is known, is representative of the condition of the entire vibration system viewed by the servo system which energizes the coils of the disc rotor 1.

In order to clarify the advantages of the steps in accordance with the invention, it is assumed that the disc rotor 1, as is customary in the known devices, is rigidly connected to the hub 7, i.e. no ribs 8 or vibration absorbers 13 are arranged between these two parts but a rigid connection. In the vibration model illustrated in FIG. 9 such a rigid connection is indicated by the dashed rectangle 41 between the flywheel masses 36 and 37. The corresponding frequency characteristic is represented by a broken line in FIG. 10. As can be seen, such a vibration system exhibits a pronounced resonant frequency, indicated by the arrow 42, which is caused by the cooperation of the sum of the two flywheel masses 36 and 37, i.e. the disc rotor 1, the hub 7 and the disc 29 connected thereto, with the flywheel mass 35, i.e. the drum section 19. Such a resonance may give rise to instabilities in the vibration system, whilst moreover allowance is to be made for the fact that in practice such a resonance is generally situated in the frequency range which also contains the frequency with which the energization of the coils of the disc rotor 1 is alternatively switched over, which may seriously disturb the complete system. The anti-resonance in the system, which is indicated by the arrow 43 and caused by the cooperation of the flywheel mass 36, i.e. the hub 7 and the disc 29 connected thereto, with the flywheel mass 35, i.e. the drum section 19, does not disturb the system because the servo system cannot excite such a frequency as can be seen from the curve portion which approximates to zero.

If instead of the rigid connection of the disc rotor 1 to the hub 7 by means of the ribs 8 a resilient coupling of the disc rotor 1 to the hub 7 is provided, i.e. the coupling symbolically represented by the narrow rectangle 39, is provided between the flywheel masses 36 and 37 in the vibration model shown in FIG. 9, the frequency characteristic of such a system will become as indicated by the dashed-dot line in FIG. 10. As can be seen, such a system exhibits two characteristic resonance modes, indicated by the arrows 44 and 45. The resonance mode 44 is caused by the cooperation of the flywheel mass 37, i.e. the disc rotor 1, with the sum of the two flywheel masses 35 and 36, i.e. the drum section 19, the hub 7 and the disc 29 connected thereto. The other resonance mode 45 is caused by the cooperation of flywheel mass 37, i.e. the disc rotor 1, with the flywheel mass 36, i.e. the hub 7 with the disc 29. As can be seen, the frequency of the resonance mode 44 is lower than the original resonance mode 42, and the resonance mode 45 is situated in a substantially higher frequency range. However, this means that no resonance occurs in the critical frequency range, in which the original resonance mode 42 was situated. Moreover, it can be seen that the resonance modes 44 and 45 are less pronounced than the original resonance mode 42. Both effects yield an improvement of the stability of the system and ensure a uniform and smooth rotation of the drum section 19 to be driven.

If in addition to the ribs 8, which have a resilient action, a vibration absorber 13, which provides a damping, is introduced in such a system, as is symbolically represented by the rectangle 40 between the flywheel masses 36 and 37 in the vibration model shown in FIG. 9, the frequency characteristic indicated by the solid line in FIG. 10 is obtained for such a system. It can be seen that when such a damping is introduced the resonant modes are damped, so that such a system exhibits a particularly high stability. Such a drive system therefore guarantees a uniform circumferential velocity of the part driven by the motor, which is essential for many uses.

As is apparent from the foregoing, several modifications to the embodiments described are possible without departing from the scope of the invention. This is in particular so with respect to the construction and arrangement of the ribs providing the resilient action, but also with respect to the arrangement and construction of the vibration absorbers, if used.

What is claimed is:

1. An electric motor comprising a rotor which is connected to at least one hub mounted on the motor shaft by means of elastic connecting elements, characterized in that at least two elastic connecting elements are constructed as ribs which extend substantially radially and axially, which have a resilient action, and which connect the rotor, which in itself is clear of the motor shaft, to the hub.

2. An electric motor as claimed in claim 1, characterized in that the hub is arranged adjacent axially spaced from the rotor and the ribs connect the rotor to the hub in the axial direction.

3. An electric motor as claimed in claim 1, in which at least one elastic connecting element is constructed as a vibration absorber with a damping effect, characterized in that, in addition to the ribs which have a resilient action, there is provided at least one vibration absorber with a damping action.

4. An electric motor as claimed in claim 2, in which at least one elastic connecting element is constructed as a vibration absorber with a damping effect, characterized in that, in addition to the ribs which have a resilient action, there is provided at least one vibration adsorber with a damping action.

5. An electric motor as claimed in claim 3, characterized in that, viewed in the circumferential direction of the hub, at least one vibration absorber is arranged between two adjacent ribs.

6. An electric motor as claimed in claim 4, characterized in that, viewed in the circumferential direction of the hub, at least one vibration absorber is arranged between two adjacent ribs.

7. An electric motor as claimed in claim 1, in which the rotor is mounted on a support, characterized in that the ribs connect the support to the hub, and the support, the ribs and the hub are integrally formed.

8. An electric motor as claimed in claim 2, in which the rotor is mounted on a support, characterized in that the ribs connect the support to the hub, and the support, the ribs and the hub are integrally formed.

9. An electric motor as claimed in claim 3, in which the rotor is mounted on a support, characterized in that the ribs connect the support to the hub, and the support, the ribs and the hub are integrally formed.

10. An electric motor as claimed in claim 4, in which the rotor is mounted on a support, characterized in that the ribs connect the support to the hub, and the support, the ribs and the hub are integrally formed.

11. An electric motor as claimed in claim 5, in which the rotor is mounted on a support, characterized in that the ribs connect the support to the hub, and the support, the ribs and the hub are integrally formed.

12. An electric motor as claimed in claim 6, in which the rotor is mounted on a support, characterized in that the ribs connect the support to the hub, and the support, the ribs and the hub are integrally formed.

13. An electric motor as claimed in claim 8 wherein said ribs and hub are plastic.

14. An electric motor as claimed in claim 9 wherein said ribs and hub are plastic.

15. An electric motor as claimed in claim 10 wherein said ribs and hub are plastic.

16. An electric motor as claimed in claim 11 wherein said ribs and hub are plastic.

17. An electric motor as claimed in claim 12 wherein said ribs and hub are plastic.

18. An electric motor as claimed in claim 13 wherein said ribs and hub are plastic.

* * * * *